United States Patent
Snyder

(10) Patent No.: US 6,315,261 B1
(45) Date of Patent: Nov. 13, 2001

(54) THERMOSTAT WIRE HOLDER DEVICE

(75) Inventor: Darryl L. Snyder, Canton, OH (US)

(73) Assignee: Snyder National Corporation, Canton, OH (US)

( * ) Notice: Subject to any disclaimer, the term of this patent is extended or adjusted under 35 U.S.C. 154(b) by 0 days.

(21) Appl. No.: 09/248,378

(22) Filed: Feb. 10, 1999

(51) Int. Cl.⁷ ........................................................ A47F 1/10
(52) U.S. Cl. ............................ 248/300; 248/65; 248/218.4
(58) Field of Search ......................... 248/300, 65, 218.4, 248/909

(56) References Cited

U.S. PATENT DOCUMENTS

| | | | |
|---|---|---|---|
| 3,730,472 | * 5/1973 | Dale | 52/436 |
| 4,447,030 | * 5/1984 | Nattel | 248/300 |
| 4,778,399 | * 10/1988 | Schenk | 248/27.1 |
| 5,141,185 | * 8/1992 | Rumbold et al. | 439/147 |
| 5,188,318 | * 2/1993 | Newcomer et al. | 248/71 |
| 5,587,555 | * 12/1996 | Rinderer | 174/49 |
| 6,166,329 | * 12/2000 | Oliver et al. | 174/58 |

* cited by examiner

Primary Examiner—Leslie A. Braun
Assistant Examiner—Holly N. Sy
(74) Attorney, Agent, or Firm—Sand & Sebolt

(57) ABSTRACT

A thermostat wire holder is used behind a portion of wall covering to hold a thermostat wire next to a hole in the wall covering where a thermostat will be located. The wire holder insulates the hole in the wall covering so that the air inside the wall does not influence the thermostat reading. The holder is generally V-shaped when installed on a stud and includes front and rear support members.

14 Claims, 2 Drawing Sheets

THERMOSTAT WIRE HOLDER DEVICE

The present invention relates to a thermostat wire holder device which is fitted around a wooden or metal wall stud in a building structure to retain a thermostat wire and thermostat in fixed insulated relation.

Normally when installing a thermostat wire or wire bundle between adjacent wall studs in a building structure, the terminating end of the wire or wire bundle is simply wrapped around a single nail temporarily or permanently attached to a wooden or metal wall stud during construction in the general location where an interior wall thermostat or other electrical device is to be permanently located. The wire normally consists of a single bundle of multiple electrical wires usually from about 2 to 12 individual electrical wires which are used to contol a thermostat or other electrical devices. Some are used for control and some are used to make electrical connection to various electrical devices. The wire or wire bundle may extend to a telephone jack, a television jack, a cable jack or a doorbell, or other electrical devices located within the building interior.

Such wiring installation is usually done after the interior wall studs are erected and prior to erecting the interior wall covering materials such as dry wall paneling, plaster, wooden wall paneling and other wall coverings. After the wall panels are installed, the precise location of the thermostat wire or wire bundle behind the covered walls is not easily determined, especially if the wall studs are covered on one or both sides by the wall covering materials. Often locating the single wire or wire bundle requires so-called "fishing" for the wire end in the hollow interior space between studs and bringing the wire outwardly into the room interior to be exposed therein for connection to the wall thermostat or other electrical device. The wire or wire bundle may be removed from its nail support or be left thereon as desired. The wire must normally be dragged through an aperture in the wall which in some cases may be excessively large and must be repaired. The wire and its surrounding space within the wall interior is essentially uninsulated which can and does adversely affect temperature settings and readings of the thermostat, for example. The lack of insulated backing and support for the control wire often results in poor and inaccurate performance of the thermostat over its controlling life within the building structure.

Accordingly, an object of the present invention is directed toward providing an insulating and support back plate for the thermostat wire and thermostat within a building structure for accurate and precise controlling of a thermostat for its insulated mounting in the interior of a building structure.

A further object of the present invention is to provide a foldable economical thin plastic mounting plate for a thermostat wire or wire bundle connected to and at least partially around a wooden or metal wall stud which has combined insulating and supporting characteristics for the wire and thermostat. The mounting plate may be easily folded from a flat stored sheet into a generally V-shaped or Z-shaped configuration for the wire holder device for its attachment to an upright wooden or metal wall stud for fixedly mounting the wire within an interior wall space for its ready interconnection to a wall thermostat or other electrical device in an interior wall-mounted location.

A still further object of the present invention is to provide a thin durable foldable insulating back plate for supporting a thermostat wire and thermostat which plate retains the wire in fixed relation between wall studs and attached to one stud in desired location for easy location of the wire end portion and providing insulation to the wire area immediately behind the wall covering once it is applied or mounted to provide interconnection to a wall thermostat or other wall-mounted device.

The subject interior backing plate for the wall space provides both insulating and supporting features to the wire mounting and adjacent hollow space surrounding the wire interiorly of nearby adjacent wall studs. The wire may be readily located and found within the wall after wall coverings are mounted or installed on interior wall studs. The plate has observation openings in one folded portion of the plate for observing the wire location and its end portion for ready connection to a wall thermostat or other device. When in its folded-over mounting relation, the plate has punched-out or recessed areas for punching out wire-receiving holes therein for passage of the wire therethrough. The plate also serves as an air-sealing device around the wire.

In the attached accompanying drawings, the designated views of the wire holder show the device in its original stored flat relation before its folding into a generally V-shaped or Z-shaped configuration, and after such folding and installation within an interior wall of a building structure.

DESCRIPTION OF THE PREFERRED EMBODIMENT

Figure 1:
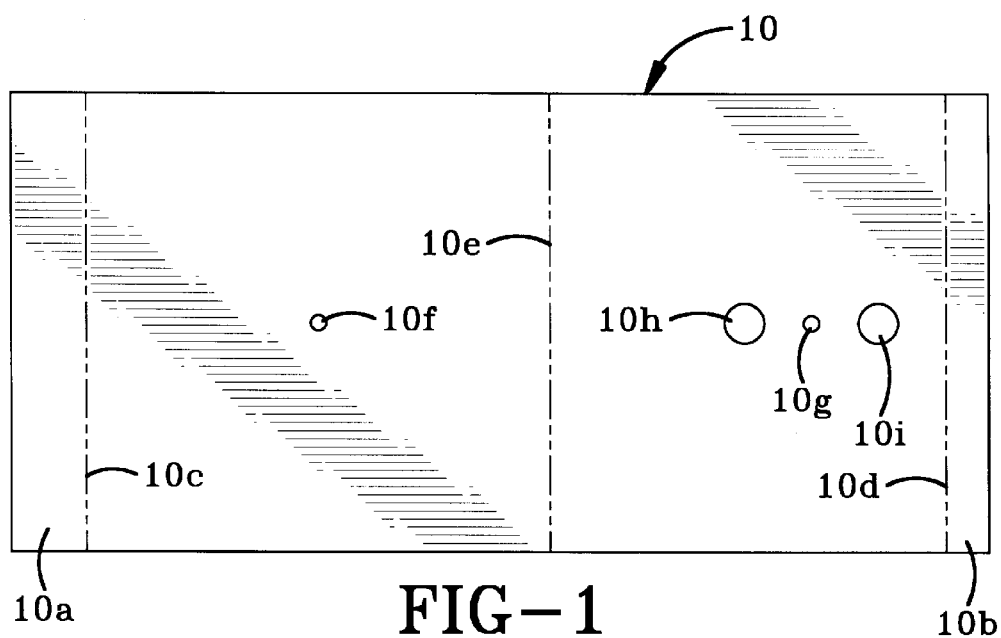
FIG. 1 is a top plan view of the retention plate showing the parallel scored fold lines of the device prior to folding into wire holding relation.

With regard to FIG. 1 of the drawings, the retention plate 10 preferably consists of a flat foldable foamed plastic material such as relatively thin foamed polystyrene or polyethylene material or other comparable plastic material. The plate 10 has preferred dimensions of about 6 by 12 inches and a thickness of about $\frac{1}{16}$ inch. Other foamed plastic materials may be used to comprise the plate; however, it should be sufficiently thin and strong to hold the thermostat wire and thermostat when mounted in fixed relation and so as not to adversely affect the planeness of facing surfaces of plural adjacent wall studs. The edge portions 10a and 10b of the plate when folded from its flat stored condition can be readily stapled, nailed or screwed to a single wooden or metal wall stud attached by the said edges. The major interior portions of the plate are then located interiorly between adjacent studs within the hollow space therebetween.

Figure 2:
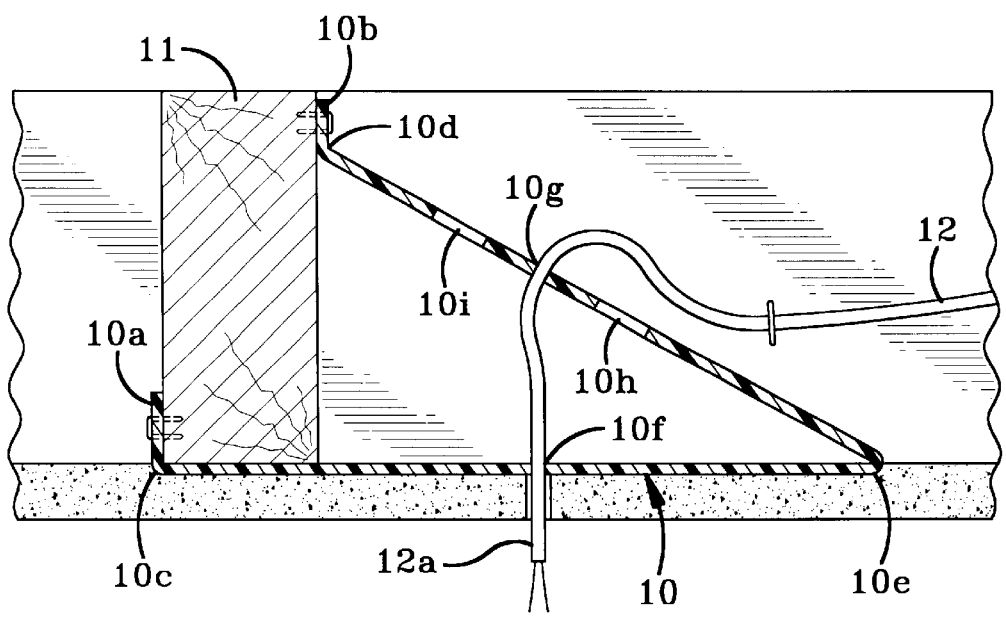
FIG. 2 is a horizontal sectional view taken along the line A—A of FIG. 3, of the retention plate of FIG. 1, with its folded edge portions attached to a single vertical wall stud in a building structure after being folded into generally V-shaped or Z-shaped configuration.
Figure 3:
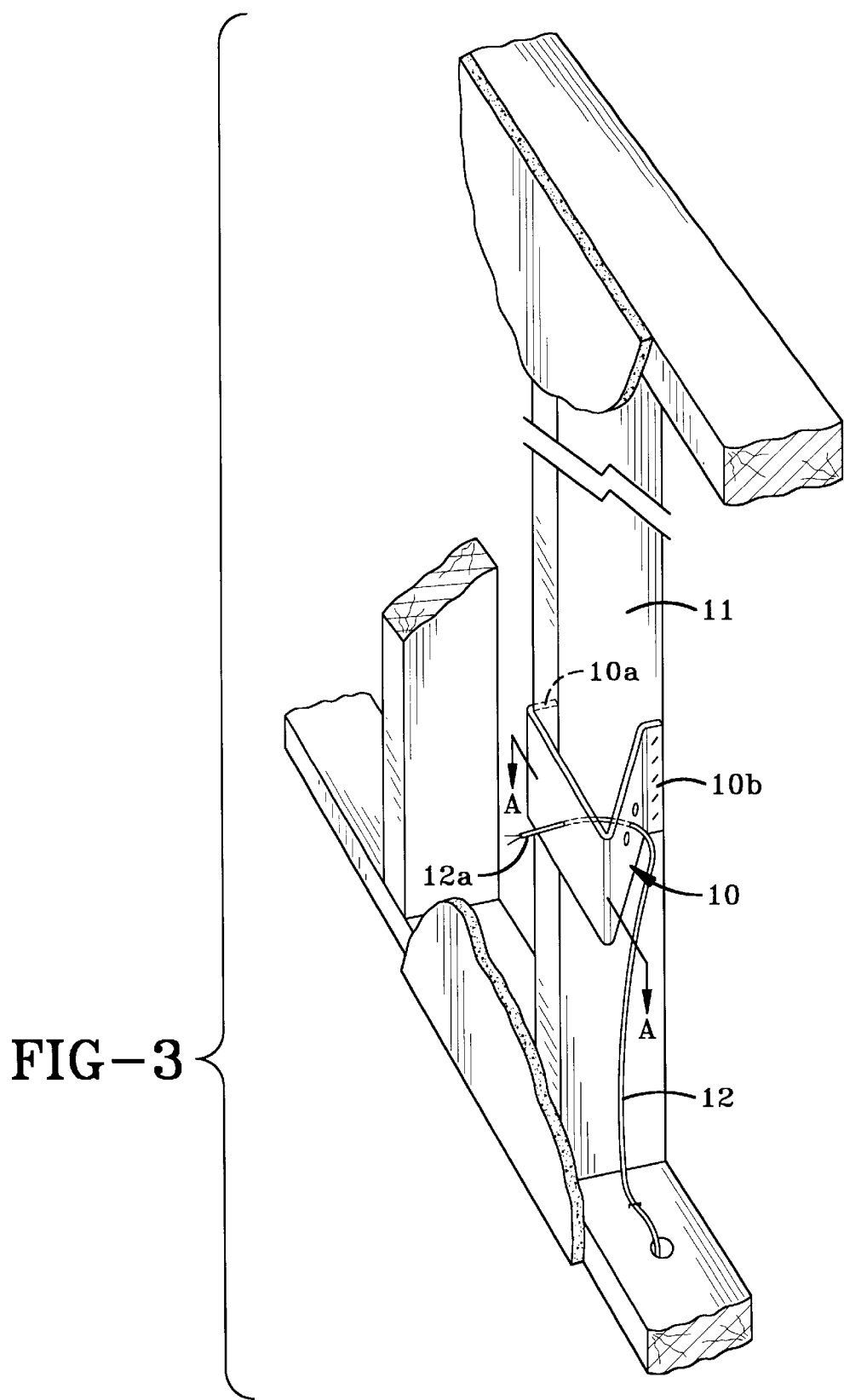
FIG. 3 is a perspective view of the retention plate of FIGS. 1 and 2 in a folded V-shaped or Z-shaped configuration attached to a single upright wall stud in a building structure, the folded plate holding a single thermostat wire or wire bundle passing through the plate in fixed insulating relation prior to the application and mounting of wall coverings.

FIG. 2 shows the plate in folded non-planar configuration with its edge portions 10a and 10b attached to the single vertical wall stud. The plate edges are attached so that one medial portion of the plate extends over and across the interiorly-facing surface of the stud. The other edge portion of the plate is attached to and against the transversely-facing interior portion of the stud. The wire or wire bundle 12 may be attached to one or more stud members of the wall such as by stapling, nailing or screwing, and brought forwardly through the pair of smaller apertures 10f and 10g which are spaced apart in horizontal alignment when the plate is folded into the generally V-shaped configuration as shown in FIGS. 2 and 3.

The V-shaped structure of the device when folded provides adequate wire supporting strength to the device for long-term retention of the wire 12 in fixed relation as well as insulation to the plate openings through which the wire is passed. The interior space behind the wall-mounted thermostat when installed is thus well insulated by the back wire-mounting plate. The plate serves a dual function of wire retention through a wall when the wire is installed as well as insulation to the enclosed wall space in and behind the thermostat whereever installed. The plate also serves to insulate around the wire access openings where formed. The room interior may be more accurately thermally controlled by the thermostat for its improved operation and control. The plate provides edge surfaces for attachment to a single stud which may be either wood or metal. The edge portions 10a and 10b of the plate are folded by a pair of parallel score lines 10c and 10d located generally equidistant from the terminating edges of the plate for their folding into angular relationship from the plane of the flat plate. The edges are readily accessible for folding into desired attachment members. The plate is easily usable in both right and left hand mounting between adjacent single studs. The right-hand portion of the plate is folded into an angle of about 45 degrees from the plane of the flat plate for stud attachment. The left-hand portion of the plate as shown in FIG. 1 is folded into a right angle for attachment to the single stud 11. The near-central scored fold line 10e of the plate is located off center to form the device with slightly dissimilar intermediate facing surfaces. Thus, the plate may be folded into a V-shaped form having facing surfaces of different lengths. The left-hand facing surface of the plate is exposed interiorly of the room and wall coverings facing the room interior area for thermostat interior wall mounting.

A pair of small apertures or indentations 10f and 10g are formed in a medial region of the plate 10 in axial alignment. The small apertures or indentations may be actual small openings having a similar diameter of about ⅛ inch or comprise slightly indented areas or markings where the thermostat wire or bundle 12 may be pushed through the plate for its retention thereby. The wire 12 then extends through two aligned holes 10f and 10g in the plate as shown in FIG. 2. A pair of larger apertures or openings 10h and 10i having a diameter of about ⅝ inch are preferably formed in the rearward side of the plate when folded such as near to smaller aperture 10g in alignment therewith to provide observation holes or viewing ports for wire mounting through the plate. Such apertures 10h and 10i provide lines of sight for locating wire 12 and its free end 12a when the wire is inserted in and through the plate from the backside. The small apertures 10f and 10g fit tightly around the wire 12 to provide air seals to the wire areas.

The plate may be easily and simply installed in the wall in selected areas during construction of the building and subsequent installation of control wires such as thermostat wire plus other types of electrical wiring to facilitate their improved installation and operation.

In the foregoing description, certain terms have been used for brevity, clearness and understanding; but no unnecessary limitations are to be implied therefrom beyond the requirement of the prior art, because such terms are used for descriptive purposes and are to be broadly construded.

Moreover, the description and illustration of the invention are by way of example, and the scope of the invention is not limited to the exact details shown or described.

Various modifications may be resorted to within the spirit and scope of the appended claims.

I claim:

1. In combination, a wall structure and a wire retention device for holding a wire relative to the wall structure:

the wall structure including at least one stud and at least one section of wall covering material disposed adjacent the stud;

the section of wall covering material having an opening adapted to receive a portion of the wire;

the stud having a front face, opposed side faces, and a rear face;

the wire retention device being connected to the stud;

the wire retention device being adapted to hold the wire adjacent the opening in the section of wall covering material;

the wire retention device including a front facing surface having a first edge and a second edge;

the wire retention device including a rear facing surface having a first edge and a second edge;

the second edge of the front facing surface and the second edge of the rear facing surface being joined;

the first edge of the front facing surface and the first edge of the rear facing surface being attached to the stud at spaced locations such that the front facing surface and rear facing surface form a V-shaped structure; and the front facing surface being disposed adjacent the opening in the section of wall covering material.

2. The combination of claim 1, wherein the front facing surface provides thermal insulation to the opening in the section of wall covering material by being disposed over the opening.

3. The combination of claim 2, wherein the front facing surface is fabricated from a plastic material.

4. The combination of claim 3, wherein the plastic material is foamed.

5. The combination of claim 1, wherein the front facing surface defines an opening adapted to receive a portion of the wire and the opening in the front facing surface is aligned with the opening in the section of wall covering material.

6. The combination of claim 5, wherein the rear facing surface defines an opening adapted to receive a portion of the wire and the opening in the rear facing surface is aligned with the opening in the front facing surface.

7. The combination of claim 6, wherein the rear facing surface defines viewing ports spaced from the opening in the rear facing surface that is adapted to receive a portion of the wire.

8. The combination of claim 5, wherein the opening in the front facing surface is adapted to fit tightly around the wire to provide an air seal.

9. The combination of claim 1, wherein the first edge of the front facing surface is connected to one of the side faces of the stud and the first edge of the rear facing surface is connected to the other of the side faces of the stud.

10. The combination of claim 9, wherein the front facing surface passes over the front face of the stud.

11. The combination of claim 1, wherein the front facing surface and the rear facing surface are folded with respect to each other along a score line.

12. In combination, a wall structure and a wire retention device for holding a wire relative to the wall structure:

the wall structure including at least one stud and at least one section of wall covering material disposed adjacent the stud;

the section of wall covering material having an opening adapted to receive a portion of the wire;

the stud having a front face, opposed side faces, and a rear face;

the wire retention device being connected to the stud;

the wire retention device being adapted to hold the wire adjacent the opening in the section of wall covering material;

the wire retention device including a front facing surface having a first edge and a second edge;

the wire retention device including a rear facing surface having a first edge and a second edge;

the second edge of the front facing surface and the second edge of the rear facing surface being joined;

the first edge of the front facing surface and the first edge of the rear facing surface being attached to the stud at spaced locations such that the front facing surface and rear facing surface form a V-shaped structure;

the first edge of the front facing surface is connected to one of the side faces of the stud and the first edge of the rear facing surface is connected to the other of the side faces of the stud;

the,front facing surface passes over the front face of the stud;

the front facing surface covering the opening in the section of wall covering material and providing insulation; and the front facing surface defining an opening adapted to receive a portion of the wire, the opening in the front facing surface being aligned with the opening in the section of wall covering material.

13. The combination of claim 12, wherein the front facing surface provides thermal insulation to the opening in the section of wall covering material by being disposed over the opening.

14. The combination of claim 13, wherein the front facing surface is fabricated from a plastic material.

* * * * *